United States Patent [19]

Weiss et al.

[11] Patent Number: 5,294,667

[45] Date of Patent: Mar. 15, 1994

[54] PREPARATION OF THERMOPLASTIC MOLDING MATERIALS BASED ON PULVERULENT POLYPHENYLENE ETHERS AND AROMATIC VINYL POLYMERS

[75] Inventors: Robert Weiss; Axel Gottschalk, both of Ludwigshafen; Klaus Muehlbach, Gruenstadt; Carola Hedtmann-Rein, Hirschberg; Robert Heinz, Mannheim, all of Fed. Rep. of Germany

[73] Assignee: BASF Aktiengesellschaft, Ludwigshafen, Fed. Rep. of Germany

[21] Appl. No.: 994,635

[22] Filed: Dec. 21, 1992

[30] Foreign Application Priority Data

Dec. 21, 1991 [DE] Fed. Rep. of Germany ....... 4142578

[51] Int. Cl.$^5$ ...................... C08L 71/12; C08L 25/04
[52] U.S. Cl. ...................... 525/68; 264/126; 264/331.11; 525/53; 525/132
[58] Field of Search ............ 525/68, 132, 53; 264/126, 331.11

[56] References Cited

U.S. PATENT DOCUMENTS 3,383,435 5/1968 Cizek .................................. 525/132
3,661,848 5/1972 Cooper et al. .................. 260/47 ET
3,787,532 1/1974 Carmelite et al. .................. 525/132
4,128,602 12/1978 Katchman et al. .................. 525/132
4,436,870 3/1984 Hinselmann et al. .................. 525/53

Primary Examiner—James J. Seidleck
Assistant Examiner—Thomas Hamilton, III
Attorney, Agent, or Firm—Keil & Weinkauf

[57] ABSTRACT

In order to prepare thermoplastic molding materials from pulverulent polyphenylene ethers and aromatic vinyl polymers by melt extrusion, the pulverulent polyphenylene ether is first of all compacted and/or sintered under pressure and if necessary with the addition of heat, preferably under a pressure corresponding to a nip pressure of from 1 to 100 kN/cm, to form a porous compact. The compact is then fed in the form of agglomerates having a particle size of from about 0.5 mm to about 20 mm into an extruder or the like, mixed with the aromatic vinyl polymer and if desired further components, and melted. In this way the proportion of the fines in the polyphenylene ether is considerably reduced, with the result that there is virtually no further danger of dust explosions. Further advantages include improved ease of metering and reduced electrostatic charge of the agglomerates. The extruded molding materials have good mechanical properties and also high thermal stability.

4 Claims, No Drawings

PREPARATION OF THERMOPLASTIC MOLDING MATERIALS BASED ON PULVERULENT POLYPHENYLENE ETHERS AND AROMATIC VINYL POLYMERS

The invention relates to a process as described in the preamble of claim 1.

It is known to precipitate high molecular weight polyphenylene ethers, after their preparation from monohydric phenols, from the reaction solution in aromatic solvents using methanol and to filter off the precipitated polymers (U.S. Pat. No. 3 661 848). The dried, pulverulent polyphenylene ether is then normally mixed with styrene polymers in an extruder. However, the large-scale industrial processing of such powders involves a considerable safety risk since dust explosions can occur in all the associated transportation and conveying procedures, including the compounding. Furthermore, the finely particulate powder may be electrostatically charged, which considerably complicates handling and thus metering of the powder. Finally, the atmospheric oxygen adhering to the finely particulate powder in combination with high processing temperatures not infrequently leads to a partial oxidative decomposition of the polymer and thus to a relatively high impurity content of the molding material.

Furthermore, EP-A-0 071 093 describes a process for preparing molding materials containing polyphenylene ether, in which solutions of polyphenylene ether and other polymers, for example styrene homopolymers or copolymers, which may if desired be modified with rubber, in organic solvents are freed from the solvent in a multistage process by evaporating said solvent. This process, which per se is product-friendly and economical, is however not satisfactory in every respect. For the final preparation of the molding materials the necessary additives such as fillers, mineral reinforcing materials, colorants or flameproofing agents have to be added to the resultant concentrates in a further compounding stage. This inevitably leads to an additional thermal and mechanical stress of the polyphenylene ether as well as of the other concentrate components, which can result in a deterioration of the thermal and mechanical properties of the end product.

It is an object of the present invention to provide a process for preparing thermoplastic molding materials based on pulverulent polyphenylene ethers and aromatic vinyl polymers that does not suffer from the aforedescribed defects, operates in a product-friendly manner, and in particular enables complex safety devices and equipment to be largely dispensed with.

We have found that this object is achieved by the features contained in the defining part of claim 1.

Advantageous modifications of the process according to the invention form the subject of the subclaims 2 to 4.

The pulverulent polyphenylene ethers (component A) suitable for the process are known, and are prepared, for example by oxidative coupling, from phenol that is preferably singly or doubly substituted in the orthoposition by alkyl, alkoxy, chlorine or bromine (U.S. Pat Nos. 3 661 848, 3 378 505, 3 306 874, 3 306 875 and 3 639 656). The alkyl or alkoxy groups, which preferably contain 1 to 4 carbon atoms, may in turn be substituted by chlorine or bromine. Suitable polyphenylene ethers are derived for example from 2,6-diethylphenol, 2-methyl-6-ethylphenol, 2-methyl-6-propylphenol, 2,6-dipropylphe 2-ethyl-6-propylphenol, 2,6-dichlorophenol and 2,6-dibromophenol or from their mixtures with one another, or for example with 2,3,6-trimethylphenol. As component A there may also be used a mixture of different polyphenylene ethers. Poly-2,6-dimethyl-1,4-phenylene ether is particularly suitable. Those polyphenylene ethers that have a limiting viscosity of from 0.3 to 0.7 dl/g (measured in chloroform at 25° C.) are preferred. Mixtures of polyphenylene ethers of different viscosities may also be used.

For the processing, i.e. for the metering and feeding into an extruder, kneader or roll mill, the pulverulent polyphenylene ether having a particle size of in general <1 mm is brought in a first process stage into a compact state. This compaction and/or sintering expediently takes place under pressure and if necessary with heating, preferably under a pressure corresponding to a nip pressure of from 1 to 100 kn/cm, in particular from 5 to 50 kn/cm, and at from about 10° C. to about 150° C., preferably from 20° C. to 50° C.

To this end the pulverulent polyphenylene ether may be subjected for example in a compression mold to a pressure of about 10–200 bar oscillating at about 10–20 kHz. The compression is graduated so that a grain boundary adhesion is produced below the crystallite melting point that is sufficient to combine the individual particles to form a granular compact. The compact can be heated up to the softening point by increasing the oscillator frequency, or alternatively by varying the compression, and can then be comminuted in the solid state.

Processing of large amounts of powder requires continuous compression molding. Compactors, for example those from Bepex GmbH, Leingarten, as well as commercially available pelleting presses are suitable for this purpose. Compactors consist essentially of two counter-rotating rollers and an extruder with a conical hopper and a stuffing screw, via which the rollers are loaded. Depending on the product properties, screws having different compaction behaviors may be used. Sheetlike compacts or compacts in the form of profiles may be continuously produced, which are then comminuted and screened to the desired particle size in further work stages by means of conventional comminution machines, for example disintegrators, and screening devices, for example screen granulators. Screened product is recycled to the compactor. The comminution and screening work stages can be-omitted if the pulverulent polyphenylene ether is compression-molded directly into compact particles or agglomerates of the desired size in a pelleting press having appropriate inserts. Altogether, particle sizes of the agglomerates prepared in this way of from about 0.5 mm to about 20 mm have proven particularly suitable for the subsequent processing.

The purpose of the compaction and/or sintering of the pulverulent polyphenylene ether is to remove the air that is contained in the interstices of the loose powder. Depending on the apparent density of the powder, compaction ratios of from about 1:1.1 to about 1:3 may be necessary, resulting in compacts having a density of about 0.5–1.1 g/cm$^3$.

The compaction leads to a marked decrease in the proportion of fine material, with the result that the danger of dust explosions is dramatically reduced. Furthermore, the danger of inhaling polymer dust is also substantially reduced. Further advantages include improved ease of metering and reduced electrostatic charge of the component A.

Component A prepared in this way is next fed into an extruder or the like, mixed with an aromatic vinyl polymer (component B) and if necessary with further components (additives), and melted.

Component B is preferably an aromatic vinyl polymer that is compatible with the polyphenylene ether employed.

Examples of preferred aromatic vinyl polymers that are compatible with polyphenylene ethers are given in the monograph by O. Olabisi, Polymer-Polymer Miscability, 1979, pp. 224 to 230 and 245.

Homopolymers and copolymers of aromatic vinyl monomers having 8 to 12 carbon atoms are suitable.

Aromatic monovinyl compounds that are suitable are in particular styrene, as well as the ring-alkylated or side chain-alkylated styrenes. Examples of suitable compounds are chlorostyrene, α-methylstyrene, styrene, p-methylstyrene, vinyltoluene and p-tert-butylstyrene. However, styrene alone is preferably used.

The homopolymers are generally prepared according to the known bulk, solution or suspension polymerization methods (see for example Ullmanns Enzyklopädie der techn. Chemie, Vol. 19, pp. 265 to 272, Verlag Chemie, Weinheim 1980). The homopolymers may have mean molecular weights $M_w$ of from 100 to 300,000, which can be determined by conventional methods.

Suitable comonomers for the preparation of copolymers are for example (meth)acrylic acid, alkyl (meth)acrylates having 1 to 4 carbon atoms in the alkyl radical, acrylonitrile and maleic anhydride, and also maleimides, acrylamide and methacrylamides and also their N,N or n-alkyl substituted derivatives having 1 to 10 carbon atoms in the alkyl radical.

The comonomers are contained in different amounts, depending on their chemical structure, in the styrene polymers. The miscibility of the copolymer with the polyphenylene ether is decisive as regards the amount of comonomers in the copolymer. Such mixing limits are known and are described for example in U.S. Pat. Nos. 4 360 618 and 4 405 753 and also in the publication by J. R. Fried, G. A. Hanna, Polymer Eng. Scie. Vol. 22 (1982), p. 705 ff. The copolymers are prepared by known methods, which are described for example in Ullmanns Enzyklopädie der techn. Chemie, Vol. 19, p. 273 ff, Verlag Chemie, Weinheim (1980). The copolymers generally have mean molecular weights ($M_w$) of from 10,000 to 300,000, which can be determined by conventional methods.

Component B) is preferably an impact-modified polystyrene whose rubber content is generally from 3 to 20% by weight, preferably from 4 to 15% by weight.

The most generally employed processes for preparing impact-modified styrene polymers are bulk or solution polymerization in the presence of a rubber, as described for example in U.S. Pat. No. 2 694 692, and bulk-suspension polymerization processes, as described for example in U.S. Pat. No. 2 862 906. Other processes may of course also be used provided that the rubber phase has the desired particle size.

The rubbers that are used are the natural or synthetic rubbers conventionally employed for the impact modification of styrene polymers. Suitable rubbers in the context of the invention include, in addition to natural rubber, for example polybutadiene, polyisoprene and copolymers of butadiene and/or isoprene with styrene and other comonomers that have a glass transition temperature, determined according to K. H. Illers and H. Breuer, Kolloidzeitschrift 190 (1), 16–34 (1963), of below −20° C.

Mixtures of impact-modified and non-impact-modified aromatic vinyl polymers may also be used, the mixing ratio being arbitrarily chosen.

Additives that are used include impact modifiers, which may be contained in amounts of up to 20% by weight, preferably up to 15% by weight, and which are different from component B).

Suitable rubbers include conventional rubbers, for example acrylate rubber and polymers of conjugated dieties, such as polybutadiene rubber and polyisoprene rubber. The diene polymers may, in a manner known per se, be partially or completely hydrogenated. The following for example are also suitable: acrylonitrile-butadiene rubber, hydrogenated styrene-butadiene rubber, ethylene-propylene-diene rubber, polybutylene and polyoctenamer rubbers, ionomers, block copolymers of aromatic vinyl monomers with dienes such as butadiene or isoprene (known per se from EP-A 62 282) having the structure M1M2-, M1M2M1M2-, M1M2M1- or M1M2M1', these block polymers also being able to contain randomly distributed segments, and also star block copolymers. Particularly suitable are polymers of conjugated dienes such as polybutadiene rubber or polyisoprene rubber. Such synthetic rubbers are known to the person skilled in the art and are described in detail in Ullmanns Encyklopädie der Technischen Chemie, 4th edition, Vol. 13, pp. 595 to 634, Verlag Chemie GmbH, Weinheim 1977.

Additives that may be mentioned include heat stabilizers and light stabilizers, lubricants and mold release agents, colorants such as dyes and pigments in normal amounts. Further additives include reinforcing agents such as glass fibers, asbestos fibers, carbon fibers, aromatic polyamide fibers and/or fillers, gypsum fibers, synthetic calcium silicates, kaolin, calcined kaolin, wollastonite, talc and chalk.

Low molecular weight or high molecular weight polymers are also suitable as additives, polyethylene wax being particularly preferred as lubricant.

Pigments that may be used are for example $TiO_2$ and various forms of carbon black.

Components A and B and if desired also the additives are generally added individually to an extruder or the like, which is known per se and is commercially available. Particularly suitable are self-cleaning, twinscrew extruders with screws that rotate in the same direction and with zonal heating and cooling of the housing.

The agglomerates of component A are first of all fed to a first zone, from where they are conveyed to a second zone. The screws in this first zone are therefore designed to effect a conveying action, the length of the first zone being from 2 to 10 times, preferably from 3 to 6 times, the screw diameter. The first zone may be heated or cooled. In all cases the temperature in this first zone is kept below the melting point of component A, so as to prevent the agglomerates clumping and sticking together. Component B and if desired also further, in particular solid mixing constituents, in which connection polymeric additives in particular are suitable, may be fed in addition to component A into this first zone. Component B may be metered in at one or more points. According to a particularly advantageous embodiment of the process, component B and the additives may be mixed with one another before being fed into the extruder.

The thermoplastically processable polymer or polymers and also the additives that may have been fed in are conveyed from this first zone to a second zone, into which all further additives and/or auxiliaries are metered and all mixing constituents are homogeneously mixed with one another with melting of the thermoplastically processable polymers.

The temperature in the second zone of the extruder is maintained sufficiently high so as to effect the melting of the thermoplastically processable polymers and also the homogeneous mixing of the individual constituents, without thereby causing any thermal damage to the products. In general this second zone is heated to from about 200° C. to about 350° C., preferably from 250° C. to 300° C., (heating temperature of the extruder) and the temperature is regulated so that the melt is at least 5° to 15° C. above the softening point of the mixture. The length of this second zone is generally from 10 to 50 times, preferably from 12 to 36, times the screw diameter. The screws in the rear part of the second zone are designed so as to produce an optimum mixing and homogenization effect. For example, known and conventional screw compounders may be used for the mixing and homogenization, intensive cross-mixing and a good dispersion effect thereby being achieved by the generation of shear force fields of different intensities. It has proved advantageous to use shear rates of from 200 to 1800 sec$^{-1}$, preferably from 350 to 850 sec$^{-1}$. The second zone may also be subdivided into a plurality of sections at different temperatures, so that for example the temperature in the front part, into which component B and additives are fed, is lower than in the rear part, in which the homogenization takes place. Furthermore, this second zone may also be equipped with a vent pipe in order to remove volatile fractions or auxiliaries.

After the venting the mixture prepared by the process is discharged from the extruder and is then processed further in a conventional manner.

The mean residence time of the products in the extruder is generally from 0.5 to 10 minutes, preferably from 1 to 5 minutes. With longer residence times there is a danger that thermally damaged products will be obtained. Sticking of the products or encrustations of the screw surfaces is avoided by the self-cleaning action of the screws. The use of self-cleaning screws thus contributes substantially to avoiding inhomogeneities in the thermoplastic molding materials.

The molding materials prepared according to the invention may comprise up to 99 to 1% by weight, preferably from 80 to 20% by weight of a polyphenylene ether and 1 to 99% by weight, preferably from 20 to 80% by weight of an aromatic vinyl polymer, and if desired from 0 to 50% by weight of additives. The molding materials have good mechanical properties and also good thermal stability.

Such molding materials are particularly suitable for producing all types of molded articles, for example by injection molding or extrusion. They may also be used to produce sheets and semi-finished products by thermoforming or blow molding.

Foams may also be produced, for which purpose conventional foaming auxiliaries are added to the granules and homogeneously mixed before the processing stage.

We claim:

1. A process for preparing a thermoplastic molding material based on pulverulent polyphenylene ethers and aromatic vinyl polymers by melt extrusion at from about 200° C. to about 350° C., comprising compacting and sintering the pulverulent polyphenylene ether under pressure, with the optional application of heat, to form a porous compact, feeding the latter in the form of agglomerates having a particle size of from about 0.5 mm to about 20 mm into an extruder, mixing and melting the agglomerates with the aromatic vinyl polymer and optionally with additives and then extruding the molten mixture.

2. A process as claimed in claim 1, wherein the pulverulent polyphenylene either is compacted and sintered at temperatures of from about 10° C. to about 150° C. and at a pressure corresponding to a nip pressure of from 1 to 100 kN/cm.

3. A process as claimed in claim 1, wherein the aromatic vinyl polymer and the additives are mixed with one another before being fed into the extruder.

4. A process as claimed in claim 1, wherein the extruded mixture contains from 99 to 1% by weight of polyphenylene ether, from 1 to 99% by weight of impactmodified polystyrene, and from 0 to 50% by weight of additives.

* * * * *